United States Patent [19]

Hütter

[11] 3,844,703
[45] Oct. 29, 1974

[54] KNOCK-OUT ARRANGEMENT FOR AN INJECTION MOLDING MACHINE

[76] Inventor: Günter Hütter, Emmestrasse 2, 6844 Altach, Austria

[22] Filed: Oct. 2, 1973

[21] Appl. No.: 402,817

[30] Foreign Application Priority Data
  Oct. 3, 1972   Austria............................. 8478
  Feb. 28, 1973   Switzerland....................... 2915

[52] U.S. Cl.............................. 425/436, 425/444
[51] Int. Cl............................................ B29c 7/00
[58] Field of Search ........... 425/436, 438, 444, 249; 164/347, 344; 249/68

[56] References Cited
UNITED STATES PATENTS
3,572,424   3/1971   Byrne................................. 164/347
3,737,268   6/1973   Ryder .............................. 425/444 X

*Primary Examiner*—Andrew R. Juhasz
*Assistant Examiner*—David B. Smith
*Attorney, Agent, or Firm*—Hans Berman

[57] ABSTRACT

The knock-out bar and ejector pins for the mold of an injection molding machine are operated through a coupling of which a first member is fastened to the knock-out bar while the second member is secured to an actuating mechanism, received in a tubular end portion of the first member when the coupling is engaged, and locked there by spring biased rollers or balls guided in openings of the tubular portion of the first coupling member obliquely inclined toward the coupling axis when the ejector pins are withdrawn. When the ejector pins reach their rest position, cooperating guide faces on the first coupling member and on a sleeve enveloping the engaged coupling members retract the rollers or balls as the sleeve is arrested by abutting engagement with the mold mounting plate.

11 Claims, 11 Drawing Figures

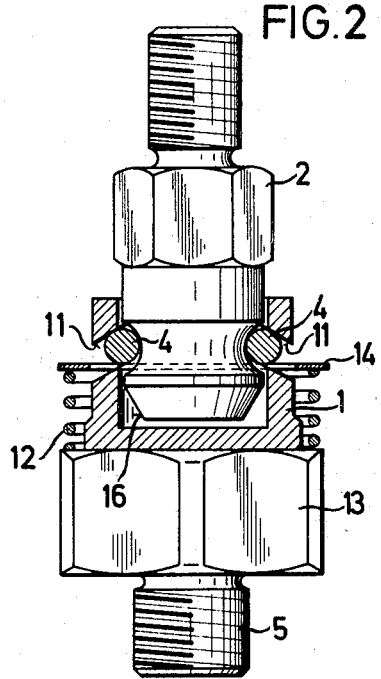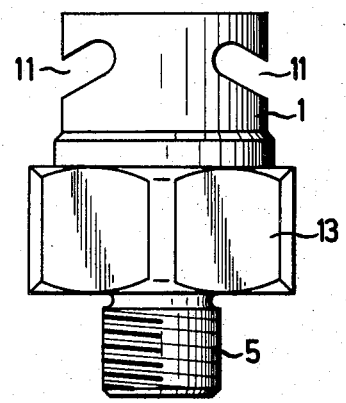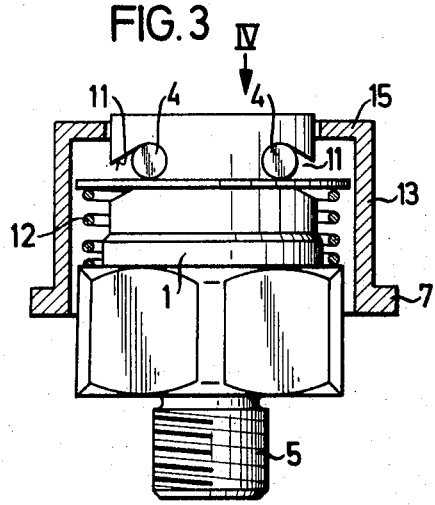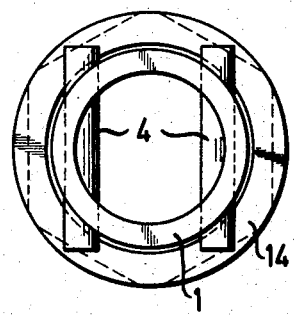

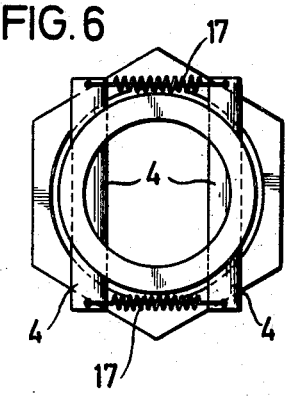
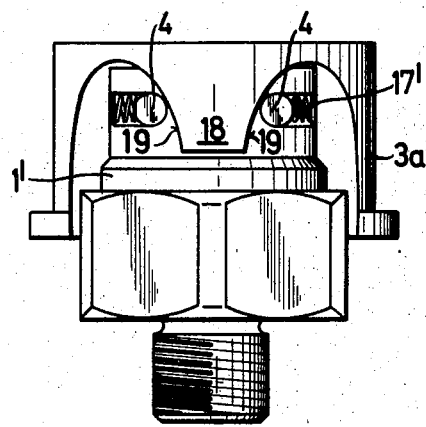
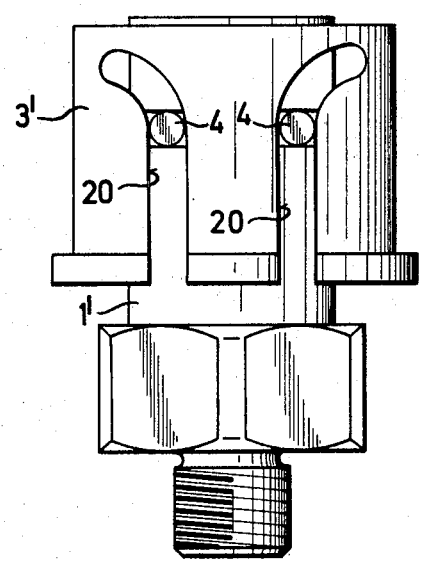
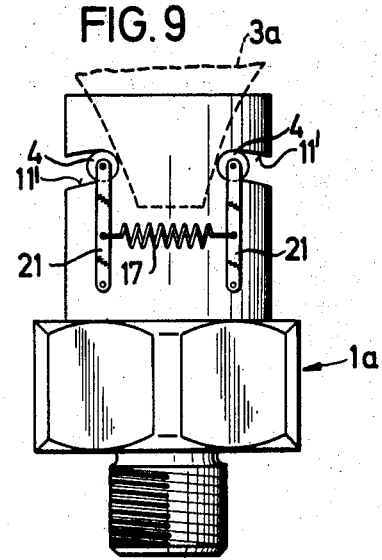

KNOCK-OUT ARRANGEMENT FOR AN INJECTION MOLDING MACHINE

This invention relates to knock-out arrangements for injection molding machines, and particularly to an improved coupling for coupling the knock-out or ejector elements to an actuating mechanism.

It was common practice for a long time to provide knock-out arrangements with an actuating mechanism which advances the ejector pins or like knock-out members toward the operating position, thereby ejecting a molding from the mold and tensioning a return spring which retracted the ejector pins when the actuating mechanism was withdrawn. If one of the pins jammed, the spring could not overcome the friction generated, and the projecting pins could be damaged beyond repair when cores or the like were thereafter inserted into the mold.

It has been proposed more recently to connect the knock-out members with the actuating mechanism by means of a coupling whose two members remained engaged both during forward movement of the ejector pins and during their retraction, but disengaged automatically as soon as the pins returned to their rest position. The known devices of this type are relatively complex and are suitable only for a fixed ejector pin stroke.

An object of the invention is an improvement in the last-described type of knock-out arrangement which simplifies the structure and thereby enhances the reliability of the coupling while making the arrangement suitable for different lengths of ejector pin stroke, as the mold employed may require.

With this object and others in view, as will presently become apparent, the knock-out arrangement of the invention has at least one locking element of circular cross section, such as a cylinder, double cone, or spherical ball which is movably secured on one of the coupling members, the other coupling member being formed with a recess aligned with the locking element transversely of the direction in which the associated knock-out member moves toward and away from its rest position. Yieldably resilient means bias the locking element inward of the recess and thereby lock the coupling members for joint movement in the aforementioned direction when the locking element is received in the recess.

Guiding devices on the sleeve and on the one coupling member cooperate for retracting the locking element from the recess of the other coupling member in response to movement of the knock-out member toward its rest position, one of the guiding devices including a guide face associated with the locking element and obliquely inclined relative to the afore-mentioned direction, the guide face engaging the locking element while it is being retracted.

Other features, additional objects, and many of the attendant advantages of this invention will readily be appreciated as the same becomes better understood by reference to the following detailed description of preferred embodiments when considered in connection with the appended drawing in which:

FIG. 2 shows elements of an engaged coupling in the apparatus of FIG. 1 in a corresponding view;

Figure 11:
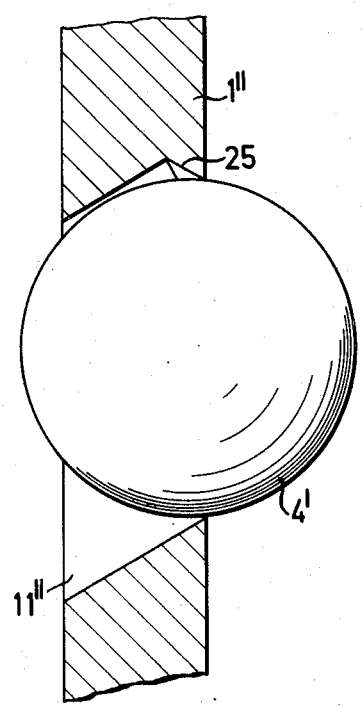
Figure 10:
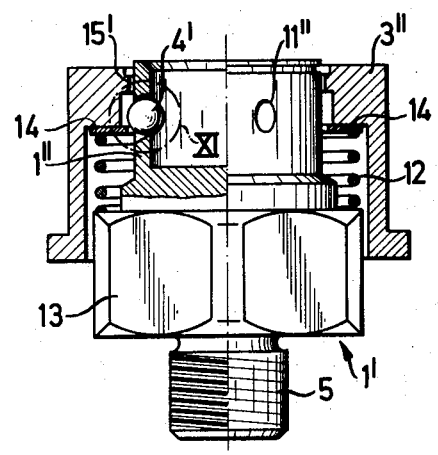

FIG. 3 similarly shows one coupling member and associated locking elements together with an associated sleeve;

FIG. 4 is an elevational view of the apparatus of FIG. 3 without the sleeve;

FIG. 5 illustrates the coupling member of FIGS. 2 to 4 in plan view;

FIG. 6 shows a portion of a modified coupling as in FIG. 4;

FIG. 7 is a plan view of a modification of the device of FIG. 3;

FIG. 8 shows yet another embodiment of the invention in fragmentary plan view corresponding to that of FIG. 7;

FIG. 9 illustrates elements of yet another coupling of the invention in plan view;

FIG. 10 shows a coupling member with associated sleeve and other elements of a coupling according to the invention in plan view and partly in section on the coupling axis; and FIG. 11 shows a small portion of the device of FIG. 10 on a much larger scale.

Figure 1:
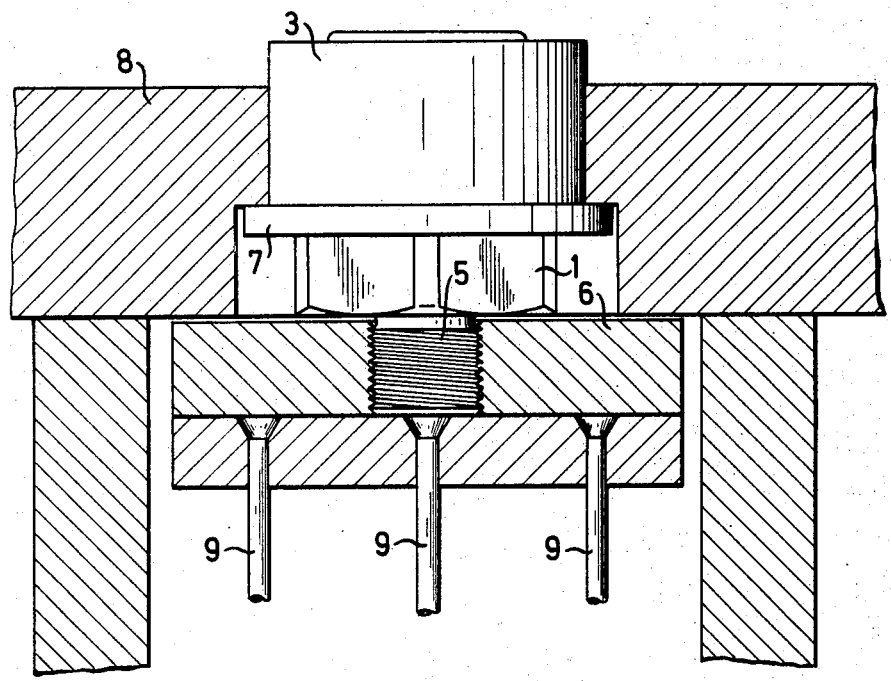
FIG. 1 shows a knock-out arrangement including a disengaged coupling of the invention in fragmentary plan section.

Referring now to the drawing in detail, and initially to FIG. 1, there is shown only as much of an otherwise conventional injection molding machine as is necessary for an understanding of this invention. The coupling which connects a knock-out bar 6 and the ejector pins 9 to an actuating mechanism has two coupling members 1, 2 illustrated in the disengaged condition. The coupling member 1 is coaxially received in and partly obscured in FIG. 1 by a cylindrical sleeve 3 axially slidable in a passage of the mold mounting plate 8 which supports the sleeve 4, and indirectly supports the coupling member 1 and associated elements in a conventional manner, not shown. Movement of the sleeve 3 toward the coaxial coupling member 2 is arrested in the illustrated position by abutting engagement of an outer radial flange 7 on the sleeve 3 and of a shoulder on the supporting plate 8. The knock-out bar 6 is closely adjacent the plate 8 in its rest position shown in FIG. 1.

The second mold member 2 has a conically tapering end portion 16 directed toward the coupling member 1 and an annular groove 10 axially adjacent the end portion 16. An axial portion 22 of hexagonal cross section is conveniently engaged by a wrench for threadedly fastening the coupling member 2 to an actuating mechanism causing axial movement of the coupling member 2 relative to the mounting plate 8 in a manner known in itself, the actuating mechanism being represented in the drawing only by threads 23 on the coupling member 2. Similar threads 5 fixedly, but releasably, fasten the coupling member 1 to the knock-out bar 6.

As is better seen in FIG. 2, the axial end portion of the coupling member 1 near the coupling member 2 is tubular, and the conical end portion and the adjacent grooved portion of the coupling member 2 are received in the bore of the coupling member 1 in the engaged condition of the coupling illustrated in FIG. 2. Two slots 11 are milled into opposite sides of the coupling member 1 and communicate with the bore of the same. As is best seen in FIG. 5, the two slots are symmetrical relative to the coupling axis and converge obliquely toward the axis and axially away from the knock-out bar 6.

A cylindrical locking element 4 is biased inward of each slot and inward of the aligned annular groove of the coupling element 2 by a flat washer 14 backed by a helical compression spring 12. As is shown in FIG. 4, the opening of the washer 14 is large enough to pass the tubular end portion of the coupling member 1, but the longitudinal end portions of the cylindrical locking elements 4 project from the slots 11 and are engaged by the spring-loaded washer 14 so that the locking elements 4 are secured in the groove 10 of the coupling element 2 by the spring 12.

As is evident from FIG. 1, the sleeve 3 encloses practically the entire tubular portion of the coupling member 1, the locking elements 4, the spring 12, and the washer 14 in the assembled device. The sleeve also receives a portion of a hexagonal part 13 of the coupling member 1 providing a seat for the spring 12 and adapted to be engaged by a wrench for mounting the knock-out bar 6 on the threads 5. An inturned flange 15 on the sleeve 3, shown in FIG. 5, axially engages the projecting longitudinal ends of the elements 4 from the opposite axial side, but otherwise as specifically illustrated for the washer 14 in FIG. 4, at least in the rest position of the knock-out bar 6.

The knock-out arrangement shown in FIGS. 1 to 5 is operated as follows, starting from the rest position of the knock-out bar 6 and the ejector pins 9 seen in FIG. 1:

Relative movement of the ejector actuating mechanism and of the plate 8 in the direction of the coupling axis drives the conically tapering end 16 of the coupling member 2 into the bore of the coupling member 1, thereby displacing the locking elements 4 from the position shown in FIGS. 3 and 4 against the restraint of the spring 12 until the locking elements can drop into the annular recess 10 of the coupling member 2 and the latter abuts against the bottom of the bore in the coupling member 1. The knock-out bar 6 and the ejector pins 9 then move with the engaged coupling members and inward of the mold, not itself shown, to eject a molded object. The sleeve 3 may move with the engaged coupling, and normally is carried along by particles of foreign matter lodged between the sleeve and the coupling member 1.

During the return stroke of the actuating mechanism, the locking elements 4 are wedged between the coupling members 1, 2 until the sleeve 3 is arrested by its flange 7 abutting against the shoulder of the plate 8, as is shown in FIG. 1, while joint movement of the coupling members 1, 2 continues. The inturned flange 15 of the sleeve 3 in cooperation with an obliquely inclined cam face or guide face of the coupling member 1 in each slot 11 guides each locking element 4 radially outward of the recess 10 in the coupling member 2 into the non-illustrated retracted position which permits the coupling member 2 to be pulled out of the bore in the coupling member 1. Thereafter, the spring 12 returns the locking elements 4 to the position shown in FIG. 3, and the pressure exerted by the elements 4 on the inturned flange 15 of the sleeve 3 causes the coupling member 1 to move inward of the sleeve 3 a very short distance so that the condition shown in FIG. 1 is restored.

It is evident from the preceding description that the stroke of the actuating mechanism and of the connected coupling member 2 is independent from that of the coupling member 1 and of the knock-out bar 6 so that no adjustments are needed for adapting the apparatus to mold assemblies of different depth.

The parts of the coupling described above with reference to FIGS. 1 to 5 may be interchanged and modified in many ways without losing the advantages of this invention, and some modifications are shown in FIGS. 6 to 11.

As is shown in FIG. 6, the helical compression spring 12 and the washer 14 may be replaced by two helical tension springs 17 which connect corresponding longitudinal end portions of the locking elements 4.

The guide functions of oblique guide faces of the coupling member 1 in the slots 11 and of the inturned flange 15 on the sleeve 3 may be reversed as is shown in FIGS. 7 to 9.

In the modified embodiment of the invention partly shown in FIG. 7, the slots in the first coupling member 1' are located in a common radial plane and are deep enough to accomodate helical compression springs 17' for biasing the locking elements 4. The guide faces of the coupling element 1' which engage the elements 4 thus are radial. The sleeve 3a has recesses in its axial wall which are bounded by narrow, arcuate cam or guide faces 19 on a projection 18, the guide faces being obliquely inclined relative to the coupling axis and thus retracting the engaged longitudinal end portions of the elements 4 when the sleeve 3a and the coupling member 1' move axially relative to each other.

The same mode of operation is achieved in the coupling partly illustrated in FIG. 8 by slots 20 in a sleeve 3' which are partly axial and partly arcuate so as to diverge away from the knock-out elements, not themselves shown in FIG. 8. The locking elements 4 are mounted on the first coupling member 1' as shown in FIG. 7, and their longitudinal end portions are received in the slots 20, only one of two pairs of such slots being visible in FIG. 8.

In the coupling of which only a few elements are shown in FIG. 9, a first coupling member 1a is provided with slots 11' for locking elements 4. The slots 11' are arcuate about the pivot axes of two pairs of arms 21 on the coupling member 1a. Each pair of arms 21 is fastened to respective ends of the two locking elements 4 and connected by a biasing tension spring 17 for the locking elements, only one pair of arms 21 and the corresponding ends of the elements 4 being seen in FIG. 9. The elements are guided outwards of the slots 11' by a sleeve 3a, partly shown in phantom view, identical in structure and function with the sleeve 3a described with reference to FIG. 7.

The first coupling member 1" illustrated in FIGS. 10 and 11 is formed with three approximately circular openings 11" which communicate with the axial bore of the member 1"', and whose walls provide obliquely inclined guide faces for spherical locking elements 4' which may be bearing balls of hardened steel. The balls 4' are biased axially away from the threads 5 on the member 1" and thereby inward of the openings 11" by a spring 12 abutting against the hexagonal portion 13 of the member 1" and a washer 14, as described with reference to the arrangement of FIGS. 1 to 5.

Projections 25 restrict the inner orifices of the openings 11" to slightly less than the diameter of the balls 4', and the wall thickness of the tubular portion of the member 1" is smaller than the radius of the balls so that the balls, when engaging the projections 25 project inward of the bore for being received in the groove 10 of the cooperating second coupling member, not itself shown in FIGS. 9 and 10, and outward of the associated opening 11" for engagement by the associated spring-loaded washer 14.

The sleeve 3" cooperating with the balls 4' has a bore dimensioned to prevent release of the balls 4' from the openings 11" in all relative positions of the sleeve 3" and the coupling member 1", and further restricted by an annular shoulder 15' which engages the washer 14 and compresses the spring 12 to permit retraction of the balls 4' when the knock-out bar 6 approaches its rest position, thereby releasing the coupling member 2.

A sleeve permanently enveloping the first coupling member, and both coupling members in the engaged coupling condition, is more conveniently provided with guide faces than the mounting plate 8 itself, and is therefore preferred, but it will be appreciated that the flange 15 in the embodiment of FIGS. 1 to 5 may be replaced by a guide portion of a flat washer fixed to the plate 8 in a corresponding position, or actually by a shoulder on the plate 8 itself. The sleeve need not be movable on the mounting plate 8, but a movable sleeve facilitates assembly of the knock-out arrangement and performs its guiding function as well as a fixed sleeve when provided with an abutment flange 7.

The positions of the two coupling members 1, 2 on the knock-out bar 6 and on the actuating mechanism represented by the threads 23 may be interchanged, and necessary modifications of other coupling elements will readily suggest themselves.

The actuating mechanism may be of any known type and will be selected to suit the relationship between the mounting plate 8 and the non-illustrated stationary base or frame of the molding machine. If the mounting plate 8 is the movable platen of the machine, the non-illustrated portion of the actuating mechanism may fixedly connect the second coupling member 2 to the frame. However, an independent hydraulic motor of the cylinder-and-piston type may constitute the non-illustrated portion of the actuating mechanism for moving the second coupling member relative to the mounting plate 8, as is also known in itself.

While certain necessary elements of the knock-out arrangement have been shown in FIG. 1 only, it will be understood that the devices illustrated in FIGS. 6 to 11 include the structure seen in FIG. 1, as far as not specifically shown otherwise.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. In a knock-out arrangement for an injection molding machine including a support; a knock-out member movable on said support in a predeterminded direction toward and away from a rest position, a first coupling member fixedly mounted on said knock-out member, a second coupling member movable in said direction toward and away from a position of engagement with said first coupling member, and actuating means for moving said second coupling member toward and away from said position thereof, and for moving said knock-out member toward and away from said rest position when said coupling members are engaged, the improvement which comprises:

a. at least one locking element of circular cross section movably secured on one of said coupling members,
  1. the other coupling member being formed with a recess aligned with said at least one locking element transversely of said direction in said position of engagement;
 b. yieldably resilient means biasing said at least one locking element inward of said recess and thereby locking said coupling members for joint movement in said direction when said at least one element is received in said recess; and
 c. guide means on said support and on said one coupling member cooperating for retracting said at least one locking element from said recess in response to movement of said knock-out member toward said rest position,
  1. one of said guide means including a guide face associated with each locking element and obliquely inclined relative to said direction, said guide face engaging the associated locking element during said retracting.

2. In an arrangement as set forth in claim 1, said one coupling member being said first coupling member, the arrangement including two of said locking elements, said one coupling member having a tubular portion formed with a bore extending in said direction and receiving said other coupling member in said position of engagement.

3. In an arrangement as set forth in claim 2, said one coupling member being formed with two openings communicating with said bore and movably receiving said locking elements respectively, a face of said one coupling member in each of said openings constituting said guide face.

4. In an arrangement as set forth in claim 3, said tubular portion having an axis extending in said direction, and said openings being symmetrical relative to said axis.

5. In an arrangement as set forth in claim 3, said locking elements being elongated, the longitudinal end portions of each element projecting outward of the associated opening when said element is received in said recess and when said element is retracted from said recess, said yieldably resilient means engaging said projecting end portion.

6. In an arrangement as set forth in claim 3, said locking elements being elongated, the longitudinal end portions of each element projecting outward of the associated opening when said element is received in said recess and when said element is retracted from said recess, the guide means on said support engaging said projecting end portions in response to said movement of said knock-out member.

7. In an arrangement as set forth in claim 2, said locking elements being elongated, the longitudinal end portions of each element projecting outward of the associated opening when said element is received in said recess and when said element is retracted from said recess, and said yieldably resilient means including a tension spring connecting respective longitudinal end portions of said two locking elements.

8. In an arrangement as set forth in claim 2, said locking elements being spherical, said one coupling member being formed with two openings communicating with said bore and movably receiving said locking elements respectively for movement toward and away from respective positions in which each locking element projects from the associated opening in two opposite directions, a face of said one coupling member in each of said openings constituting said guide face.

9. In an arrangement as set forth in claim 2, said other coupling element having a tapering end portion directed inward of said bore when said coupling element approaches said position of engagement.

10. In an arrangement as set forth in claim 2, the guide means on said support including a sleeve member movable on said support in said direction toward and away from a predetermined position, and cooperating abutment means on said support for arresting said sleeve member in said predetermined position when said sleeve member moves in the direction of movement of said knock-out member toward said rest position, a portion of said sleeve member engaging said at least one locking element when said sleeve member is arrested in said predetermined position while said one coupling member approaches said rest position, said sleeve member enveloping said one coupling member.

11. In an arrangement as set forth in claim 10, said one coupling member being formed with two openings communicating with said bore and movably receiving said locking elements respectively, said portion of said sleeve member constituting each guide face.

* * * * *